(12) United States Patent
Strasman et al.

(10) Patent No.: US 8,175,175 B1
(45) Date of Patent: May 8, 2012

(54) METHOD AND SYSTEM FOR RATE-SHAPING AND TRANSMITTING MEDIA STREAMS

(75) Inventors: Nery Strasman, Ramat Gan (IL); Harold Roberts, Prior Lake, MN (US)

(73) Assignee: Aaris Group Inc., Suwanee, GA (US)

( * ) Notice: Subject to any disclaimer, the term of this patent is extended or adjusted under 35 U.S.C. 154(b) by 1039 days.

(21) Appl. No.: 11/692,939

(22) Filed: Mar. 29, 2007

Related U.S. Application Data

(60) Provisional application No. 60/744,147, filed on Apr. 3, 2006.

(51) Int. Cl.
*H04K 1/10* (2006.01)

(52) U.S. Cl. ........ 375/260; 375/144; 375/145; 375/146; 375/240.02; 375/240.23; 375/240.24; 375/240.25; 375/295; 370/230.1; 370/537; 370/229; 370/230; 370/231; 370/232; 370/538; 370/535; 370/536; 370/235

(58) Field of Classification Search .................. 375/260, 375/144, 145, 146, 240.02, 240.23, 240.24, 375/240.25, 295; 370/230.1, 537, 229, 230, 370/231, 232, 538, 535, 536, 412–419, 235
See application file for complete search history.

(56) References Cited

U.S. PATENT DOCUMENTS

| | | | | |
|---|---|---|---|---|
| 5,384,845 A * | 1/1995 | Lopatin et al. | ................. | 380/270 |
| 6,744,808 B1 * | 6/2004 | Walley et al. | ................. | 375/146 |
| 6,798,736 B1 * | 9/2004 | Black et al. | ................... | 370/208 |
| 7,389,356 B2 * | 6/2008 | Shao et al. | ..................... | 709/235 |
| 7,463,608 B2 * | 12/2008 | Bolgiano et al. | .............. | 370/335 |
| 7,489,701 B2 * | 2/2009 | Lodha | ........................... | 370/412 |
| 2003/0231593 A1 * | 12/2003 | Bauman et al. | ................ | 370/235 |
| 2005/0038637 A1 * | 2/2005 | Balakrishnan et al. | ........... | 703/2 |
| 2005/0180415 A1 * | 8/2005 | Cheung et al. | ................ | 370/389 |
| 2006/0095943 A1 * | 5/2006 | Demircin et al. | ............... | 725/81 |
| 2007/0097851 A1 * | 5/2007 | Adachi | ........................ | 370/206 |
| 2007/0133405 A1 * | 6/2007 | Bowra et al. | .................. | 370/230 |

* cited by examiner

*Primary Examiner* — Siu Lee

(57) ABSTRACT

A method for rate-shaping media streams; the method includes: receiving multiple input media streams, transmission parameters, wired transmission limitations and wireless transmission limitations that represent a current status of a wireless medium; and rate-shaping at least one input media stream out of the multiple input media streams, in response to: (i) the transmission parameters, (ii) the wireless transmission limitations, and (iiii) input media stream parameters. A system for processing media streams; the system includes: a controller, adapted to determine rate-shaping parameters in response to: (i) the transmission parameters, (ii) the wireless transmission limitations, and (iii) input media stream parameters; and a rate-shaper, connected to the processor, adapted to receive multiple input media streams and perform rate-shaping according to the rate-shaping parameters.

17 Claims, 4 Drawing Sheets

METHOD AND SYSTEM FOR RATE-SHAPING AND TRANSMITTING MEDIA STREAMS

RELATED APPLICATIONS

This application claims priority from U.S. provisional patent Ser. No. 60/744,147 dated Apr. 3, 2006.

FIELD OF THE INVENTION

The present invention relates to communication methods and systems in general, and to methods and systems for rate-shaping and transmitting media streams

BACKGROUND OF THE INVENTION

Multiple Access Variable Code

Code Division Multiple Access is a well known multiplexing method. A wireless medium can be shared by multiple users by using different pseudo-random code sequencers for different users. The pseudo-random code sequencers encode received data streams by codes that are ideally orthogonal to each other.

A CDMA modulator includes an encoder that converts an input data stream into an encoded data stream that is transmitted over a wireless medium. The relationship between the size of a data stream, bit rate of the data stream or a bandwidth consumed by the data stream, before being CDMA encoded and between the size a CDMA encoded data stream, bit rate of the encoded data stream or a bandwidth consumed by the encoded data stream, is referred to as a CDMA encoding factor.

The following U.S. patents describe various methods and systems for CDMA encoding: U.S. Pat. No. 7,035,201 of Fu et al., titled "Programmable transceiver structure of multi-rate OFDM-CDMA for wireless multimedia communications"; U.S. Pat. No. 6,421,336 of Proctor, Jr., et al, titled "Variable rate orthogonally coded reverse link structure"; and U.S. Pat. No. 7,088,700 of Lee et al., titled "Apparatus and method for coding/decoding TFCI bits in an asynchronous CDMA communication system".

Rate-Shaping Techniques

In many media generation and distribution systems multiple video streams are conveyed over a shared wired channel. The aggregate bandwidth of these video streams should not exceed the available bandwidth of the shared wired channel.

Various lossy and lossless techniques are implemented to adapt the aggregate bandwidth of the programs of a Transport Stream to the available bandwidth of a channel. U.S. Pat. Nos. 6,038,256 and 6,192,083 of Linzer et al, U.S. Pat. Nos. 5,862, 140 and 5,956,088 of Shen et al and U.S. Pat. No. 5,877,812 of Krause et al, describe some of these prior art methods. Lossless techniques, such as statistical multiplexing, do not require further compressing of media pictures. Lossless techniques also include delaying or advancing a transmission of transport packets. Lossy techniques involve additional compression (also referred to as rate shaping), and are usually implemented whenever the appliance of lossless techniques is not feasible or does not provide sufficient results. The further compression usually results in visual quality degradation.

Typically, the rate-shaping is responsive to the bandwidth of the shared wired channel and ignored other limitations that can be imposed on the video streams. For example, the rate-shaping ignores any affect that CDMA encoding will have upon the media stream. Accordingly, two video streams of the same priority (same quality of service level) can be subjected to the same rate-shaping scheme but can be CDMA encoded and then transmitted at a totally different bit rate over a wireless medium, thus allocating more wireless medium resources to one media stream. Yet for another example, the CDMA code length can be dynamically altered to compensate for changes in the wireless link (for example—a certain wireless channel becomes noisier) but the rate-shaper is indifferent to these alterations.

Media Over Wireless Channels

As bandwidth capabilities increase with wireless technologies, users will want real-time and non-real-time video available for mobile download. This can be achieved with either the various mobile technologies of EV-DO with CDMA or with HSDPA (High Speed Downlink Packet Access) with GSM or alternatively the evolving technologies of WiMAX/ 802.16, Flash-OFDM/802.20 or future 4G standards. However, the wireless channel will remain a bandwidth limited channel and as the wideband features become more popular, there will be an increasing pressure to use the bandwidth efficiently and effectively. The higher the number of video/ voice/music channels that can be compressed into a limited channel bandwidth while maintaining a certain minimum quality of media, the more revenue a carrier will be able to generate from said channel.

Wireless channels differ from wired channels in various aspects. On one hand, wired channels are: (i) static with respect to bandwidth capacity, (ii) have a fixed modulations scheme (for example QAM64 or QAM256), (iii) are relatively wide (some can carry approximately 30 Mbps and 40 Mbps respectively), (iv) the Per-user or Per-CPE capacity is also static, thus each user experiences virtually the same physical plant characteristics and has the ability to access the same portion (virtually 100%) of the channel.

On the other hand, wireless channels are characterized by: (i) rapid channel state alterations (including rapid channel capacity changes), (ii) the wireless channel between one user and a base station differs from the wireless channel, (iii) the wireless channels differ on a CPE-basis, and the like.

There is a need to provide efficient rate shaping and encoding systems.

SUMMARY OF THE PRESENT INVENTION

A method for rate-shaping media streams; the method includes: (a) receiving multiple input media streams, transmission parameters, wired transmission limitations and wireless transmission limitations that represent a current status of a wireless medium; and (b) rate-shaping at least one input media stream out of the multiple input media streams, in response to: (i) the transmission parameters, (ii) the wireless transmission limitations, and (iii) input media stream parameters.

A system for processing media streams; the system includes: (a) a controller, adapted to determine rate-shaping parameters in response to: (i) the transmission parameters, (ii) the wireless transmission limitations, and (iii) input media stream parameters; and (b) a rate-shaper, connected to the processor, adapted to receive multiple input media streams and perform rate-shaping according to the rate-shaping parameters.

A method for rate-shaping and transmitting media streams, the method includes: (a) receiving multiple input media streams, wireless transmission limitations, and possible transmission parameters; and (b) selecting at least one transmission parameter out of the possible transmission parameters and determining media streams rate-shaping parameters; wherein the selecting and determining are responsive to: (i) the wireless transmission limitations, and (ii) input media stream parameters.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

It should be noted that the particular terms and expressions employed and the particular structural and operational details disclosed in the detailed description and accompanying drawings are for illustrative purposes only and are not intended to in any way limit the scope of the invention as described in the appended claims.

Figure 1:
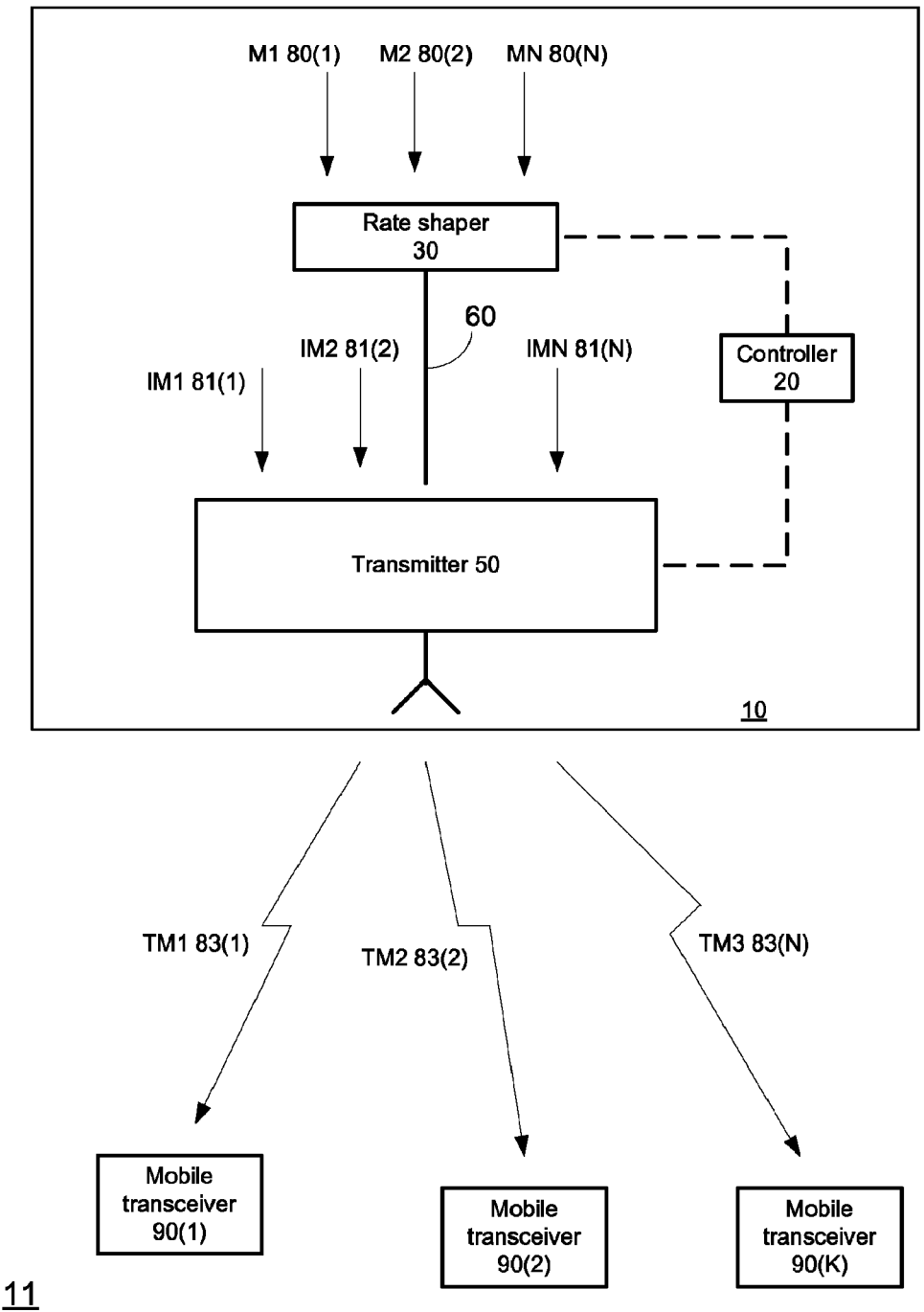
FIG. 1 illustrates a system and its environment, in accordance to a preferred embodiment of the invention.

FIG. 1 illustrates system 10 for rate-shaping and encoding media streams, and its environment 11, according to an embodiment of the invention.

System 10 includes controller 20, rate shaper 30 and transmitter 50. Transmitter 50 can include a variable encoder, can include a receiver, can be connected to a variable encoder, and alternatively or additionally can be connected to a receiver. Typically, the transmitter and received are integrated to form a transceiver that can share multiple components (including antenna).

Transmitter 50 is aware of the state of the wireless medium, preferably by receiving inputs from the receiver. The wireless medium includes multiple wireless channels. The state of a channel can be expressed in various manners including signal to noise level, noise level, multi-path affect, interference level, cross talk level, and the like.

The state of the wireless channel can change rapidly, and can differ from one user to the other and from one CPE to another. The wireless channel status can change due to the movement of the user, changes in the environment of the user, temperature changes, transmissions from other networks, communication equipment failures, network load and the like.

These status changes are conveniently provided to transmitter 50 and it can change some transmission parameters (including modulation parameters, error correction codes, preamble, guard bands, sub-channels assignments, spectral power density) while other transmission parameters (such as encoding length) can be set by controller 20. According to various embodiments of the invention controller 20 can determine all transmission parameters, transmitter 50 can determine all transmission parameters, but this is not necessarily so.

Conveniently, controller 20 can respond to the dynamically changing status of the wireless channels by altering the rate-shaping scheme. Conveniently, controller 20 is adapted to determine rate-shaping parameters in response to: (i) transmission parameters, (ii) wireless transmission limitations, and (iv) input media stream parameters.

Controller 20 can also determine rate-shaping parameters in response to wired transmission limitations, but this is not necessarily so. Wired transmission limitations represent various limitations on the wired transmission of media streams over bandwidth limited wired link 60. This may include the available bandwidth of the bandwidth limited wired link.

Wireless transmission limitations represent a wireless medium resource that can allocated for transmission of media streams in view of the state of the various wireless channels. The wireless medium resource as well as transmission parameters affect the (effective) bit rate of the media stream that is wirelessly transmitted. The resource can include spectrum, time slots, and the like.

Figure 2:
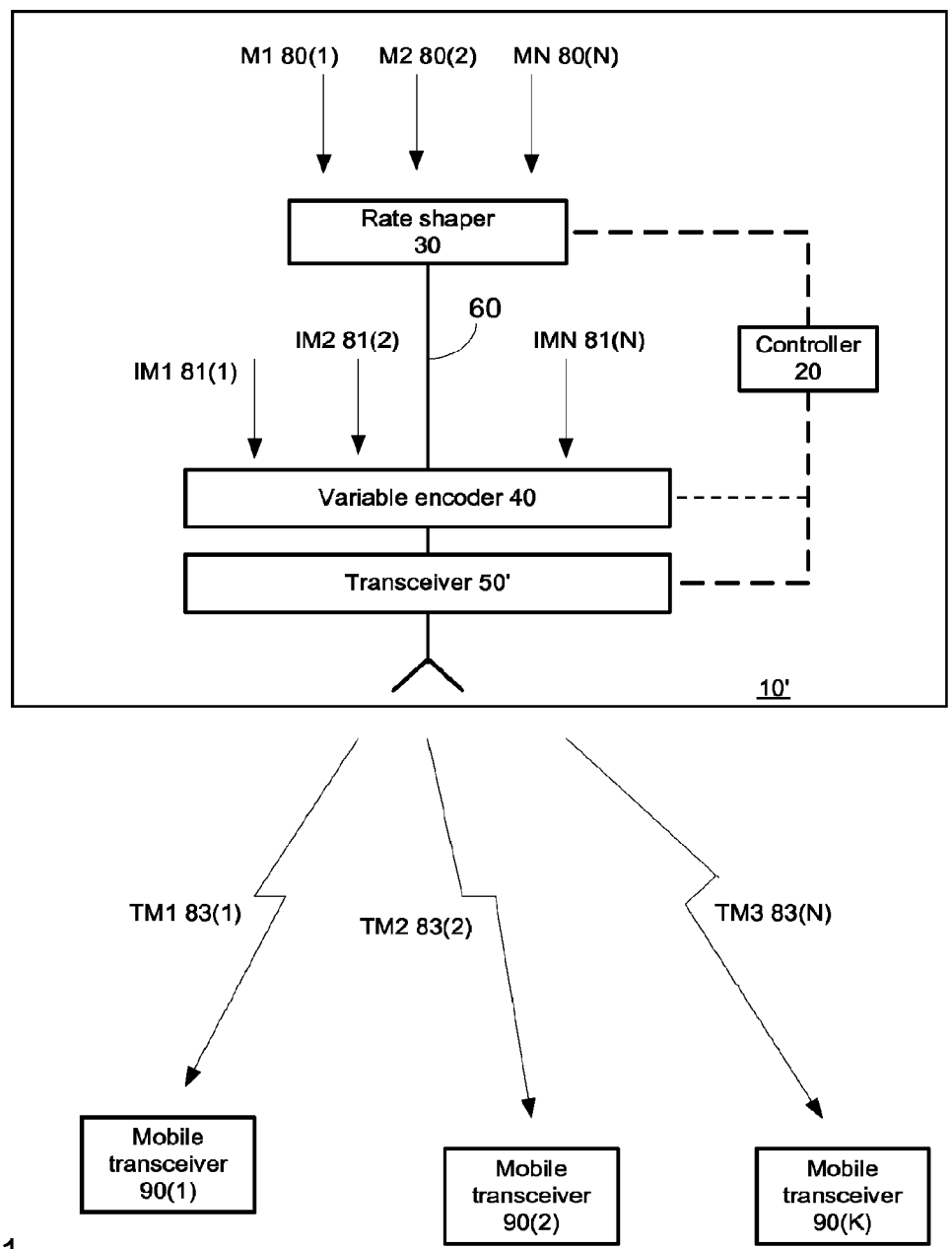
FIG. 2 illustrates a system and its environment, in accordance to a preferred embodiment of the invention.

Input media stream parameters include the size of the media streams as well as other attributes such as but not limited to their priority. It is noted that bandwidth limited wired link is optional and that rate-shaper 30 and transmitter 50 can be connected in other matters, thus rendering wired transmission limitations irrelevant. FIG. 1 and FIG. 2 include bandwidth limited wired link 60 for simplicity of explanation.

Rate shaper 30 is connected to transmitter 50 over bandwidth limited wired link 60. The bandwidth limited wired link 60 can include one or more buses, one or more wired networks, and the like.

Controller 20 controls the operation of rate-shaper 30 and transmitter 50, as indicated above. Controller 20 can send to rate-shaper 30 rate-shaping parameters and send to transmitter 50 transmission parameters such as an encoding factor.

The rate-shaping parameters can include a rate-shaping factor or a maximal bandwidth allocated per each input media stream or per a sub-group of media streams. A rate-shaping factor can represent an expected ratio between the size (or bit rate) of an input media stream and the size (or bit rate) of the media stream after the rate-shaping. Yet according to another embodiment of the invention the rate-shaping factor can represent a quantization factor.

For simplicity of explanation a media stream that is sent over bandwidth limited wired link 60 is referred to as an intermediate media stream. An intermediate media stream can be a rate-shaped version of an input media stream (if rate-shaping is applied) or can be the input media stream (if rate-shaping is not applied on this input media stream). In FIG. 1 media streams M1-MN 80(1)-80(N) are converted to multiple intermediate media streams IM1-IMN 81(1)-81(N). Usually, at least one intermediate media stream is rate-shaped. The intermediate media streams are processed and transmitted over a wireless medium, as indicated by transmitted media streams TM1-TMN 83(1)-83(N) that are sent to mobile transceivers 90(1)-90(K). K and N are positive integers. K is equal to N or bigger than N.

According to an embodiment of the invention the rate-shaping is responsive to the transmission of the encoded media stream over the wireless medium.

Conveniently, the rate-shaping is also responsive to the propagation of the intermediate media streams over the bandwidth limited wired link 60.

Controller 20 can determine both the rate-shaping parameters and one or more transmission parameters (especially the encoding factors) such as to optimize the overall propagation and transmission process of the media streams, whereas the optimization can be expressed by at least one of the following: (i) allocating substantially the same wireless medium resources to media streams that have the same priority (or quality of service); (ii) allocating wireless medium resources within the same wireless medium resource range to media streams that have the same priority (or quality of service); (iii) alter rate-shaping parameters and/or encoding factor in response to changes in the transmission limitations of the wireless medium.

The allocation of ranges allows a provision of substantially the same bit rate to media streams of the same priority, without imposing too many constraints on the rate-shaping and transmission processes.

It is noted that controller 20 can perform other optimizations and that it can define or receive a target function that performs optimizations in response to that target function. The target function can refer to communication losses, failures, quality of audio, quality of video and the like.

It is noted that the above explanation refers to the transmission process as including both various processing of media streams as well as to the radio-frequency transmission of the media streams. Those of skill in the art will appreciate that the transmission process can be split to multiple sub-processes, as illustrated in FIG. 2.

FIG. 2 illustrates system 10' and its environment 11, in accordance to a preferred embodiment of the invention.

In system 10' the transmitter is integrated with a receiver to provide a transceiver 50' and a variable encoder 40 is connected to the transceiver 50' (instead of being included within transmitter 50, as illustrated in FIG. 1).

Conveniently, controller 20 determines encoding factors out of multiple possible encoding factors and sends the encoding factors to variable encoder 40. It is noted that controller 20 can determine other transmission factors and send them to transceiver 50'.

Variable encoder 40 sends encoded media streams to transceiver 50 that transmits them over the wireless medium.

Figure 3:
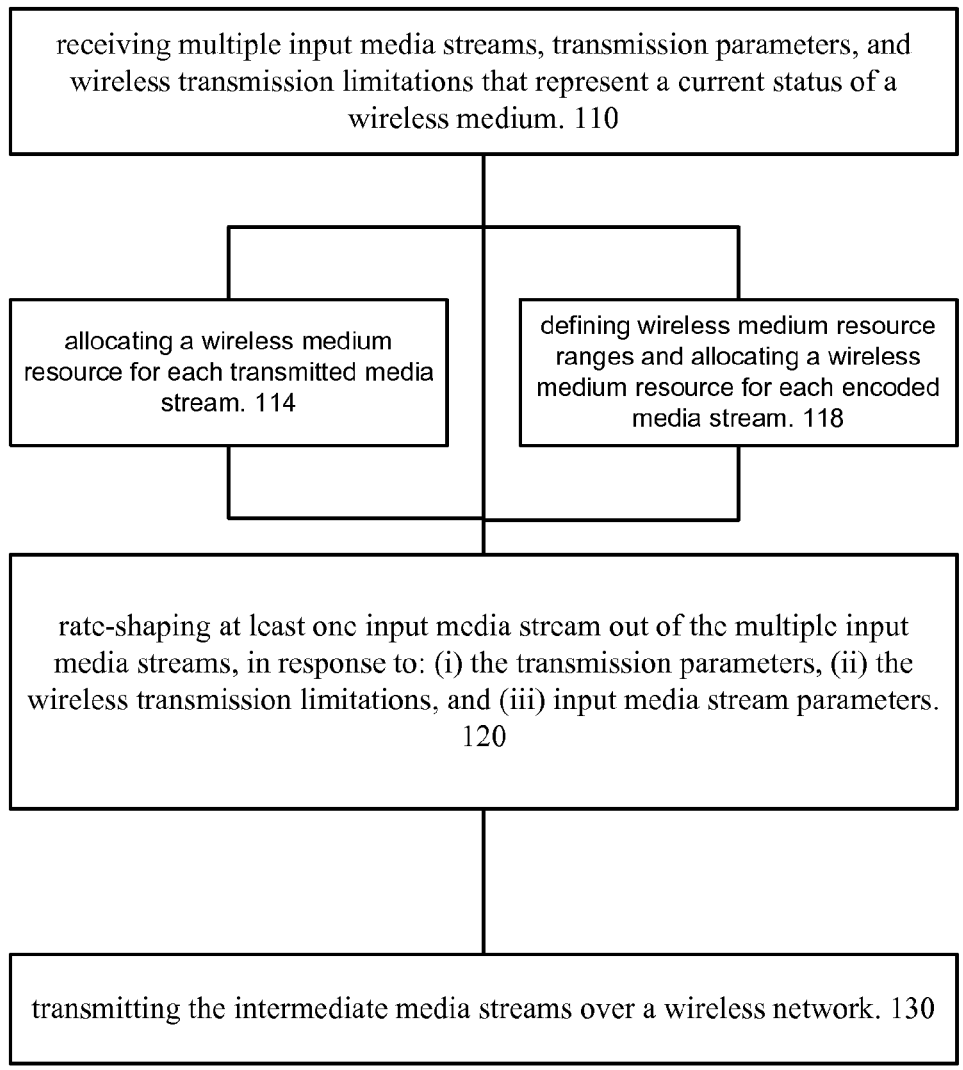
FIG. 3 is a flow chart diagram of a method for rate-shaping media streams, in accordance with a preferred embodiment of the invention.

FIG. 3 illustrates method 100 for rate-shaping media streams according to an embodiment of the invention.

Method 100 starts by stage 110 of receiving multiple input media streams, transmission parameters, and wireless transmission limitations that represent a current status of a wireless medium.

Stage 110 can be followed by stage 120, as well as by either one of optional stage 114 and 118. Stages 114 and 118 are followed by stage 120.

Stage 114 includes allocating a wireless medium resource for each encoded media stream. If stage 114 is executed then stage 120 can include performing rate-shaping such that encoded media streams of the same priority are allocated with substantially equal amounts of wireless medium resources.

Stage 118 includes defining wireless medium resource ranges and allocating a wireless medium resource for each encoded media stream. If stage 118 is executed then stage 120 can include rate-shaping such that media streams of a same priority are allocated wireless medium resources that are included within a single wireless medium resource range.

Stage 120 includes rate-shaping at least one input media stream out of the multiple input media streams, in response to: (i) the transmission parameters, (ii) the wireless transmission limitations, and (iii) input media stream parameters. Conveniently, the rate-shaping can also be responsive to wired transmission limitations, although this is not necessarily so.

Conveniently, the rate-shaping is responsive to the priority of the media streams.

The output of stage 120 is multiple intermediate media streams. An intermediate media stream can be a rate-shaped version of an input media stream (if rate-shaping is applied) or can be the input media stream (if rate-shaping is not applied on this input media stream).

Stage 120 is followed by stage 130 of transmitting the intermediate media streams over a wireless network. Stage 130 can include encoding the intermediate media streams to provide encoded media streams, as well as performing other processing stages such as error correction, guard insertion and the like. The transmission is responsive to transmission parameters such as encoding factors, and the like.

Conveniently, stage 130 includes at least one of the following: (i) applying different transmission parameters to different media streams, (ii) encoding multiple media streams by using different encoding factors, (iii) performing CDMA encoding, and especially variable length CDMA encoding.

Figure 4:
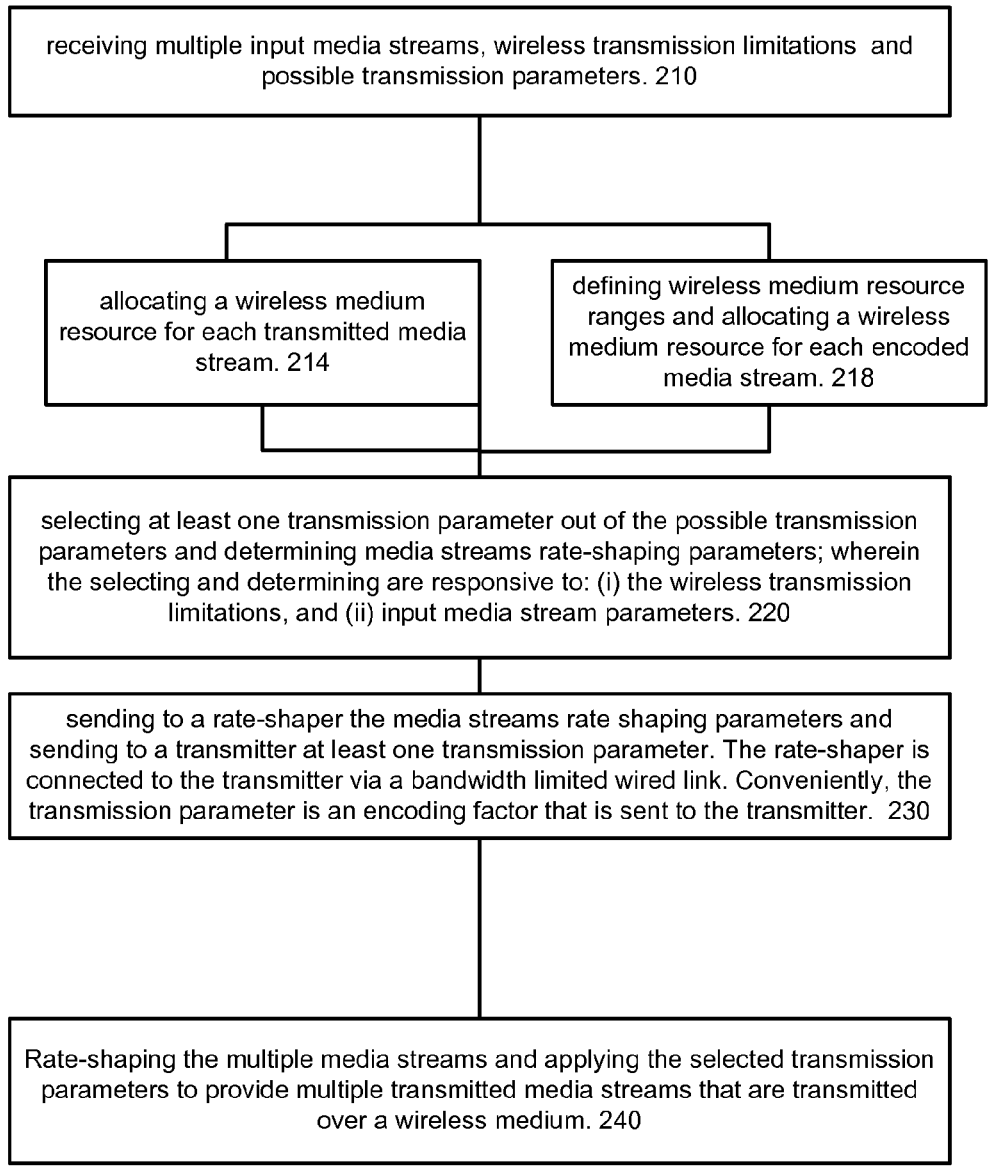
FIG. 4 is a flow chart diagram of a method for rate-shaping and transmitting media streams, in accordance with a preferred embodiment of the invention.

FIG. 4 illustrates method 200 for rate-shaping and transmitting media streams according to an embodiment of the invention.

Method 200 starts by stage 210 of receiving multiple input media streams, wired transmission limitations and possible transmission parameters.

Stage 210 can be followed by stage 220, as well as by either one of optional stage 214 and 218. Stages 214 and 218 are followed by stage 220.

Stage 214 includes allocating a wireless medium resource for each encoded media stream. If stage 214 is executed then stage 220 can include performing rate-shaping such that encoded media streams of the same priority are allocated with substantially equal amounts of wireless medium resources.

Stage 218 includes defining wireless medium resource ranges and allocating a wireless medium resource for each encoded media stream. If stage 218 is executed then stage 220 can include rate-shaping such that media streams of a same priority are allocated wireless medium resources that are included within a single wireless medium resource range.

Stage 220 includes selecting at least one transmission parameter out of the possible transmission parameters and determining media streams rate-shaping parameters; wherein the selecting and determining are responsive to: (i) the wireless transmission limitations, and (ii) input media stream parameters. Conveniently, the selecting can also be responsive to wired transmission limitations, although this is not necessarily so.

Conveniently, stage 220 includes selecting at least one encoding factor out of the possible encoding factors and determining media streams rate-shaping parameters; wherein the selecting and determining are responsive to: (i) the wireless transmission limitations, and (ii) input media stream parameters. Conveniently, the selecting and determining are also responsive to the wired transmission limitations.

Stage 220 is followed by stage 230 of sending to a rate-shaper the media streams rate shaping parameters and sending to a transmitter at least one transmission parameter. The rate-shaper can be connected to the transmitter via a bandwidth limited wired link but this is not necessarily so. Conveniently, the transmission parameter is an encoding factor that is sent to the transmitter. It is noted that if the transmitter does not include the variable encoder then the encoding factor is sent to the variable encoder.

Stage 230 is followed by stage 240 of rate-shaping the multiple media streams and applying the selected transmission parameters to provide multiple transmitted media streams that are transmitted over a wireless medium.

Conveniently, stage 240 includes encoding multiple media streams by using different encoding lengths.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

We claim:

1. A method for rate-shaping media streams; the method comprises: receiving multiple input media streams, transmission parameters, and wireless transmission limitations that represent a current status of a wireless medium; rate-shaping, by a rate shaper, at least one input media stream out of the multiple input media streams to provide intermediate media streams, in response to: (i) the transmission parameters, (ii) the wireless transmission limitations, and (iii) input media stream parameters; wherein the transmission parameters are selected from a group consisting of modulation parameters, preamble, guard bands and spectral power density; changing, by a transmitter that comprises a variable encoder, at least one transmission parameter in response to the status of the wireless medium; and applying, by the transmitter, the transmission parameters on the intermediate media streams.

2. The method according to claim 1 wherein the rate-shaping is also responsive to wired transmission limitations of a wired bandwidth link coupled between the transmitter and the rate shaper.

3. The method according to claim 1, wherein the at least one transmission parameter is the spectral power density.

4. The method according to claim 1, wherein the method comprises changing an encoding length of the variable encoder of the transmitter by a controller.

5. The method according to claim 3 further comprising applying different transmission parameters to different media stream; wherein the different transmission parameters are selected from the group consisting of modulation parameters, preamble, guard bands and spectral power density.

6. The method according to claim 1 further comprising determining, by a controller, both rate-shaping parameters and at least one transmission parameter such as optimize an overall propagation and transmission process, wherein the optimize is responsive to a target function that refers to quality of audio; wherein the at least one transmission parameter is the spectral power density.

7. The method according to claim 3 further comprising allocating a wireless medium resource for each encoded media stream and wherein the stage of rate shaping is performed such that encoded media streams of a same priority are allocated with substantially equal amounts of wireless medium resources.

8. The method according to claim 3 further comprising defining wireless medium resource ranges; allocating a wireless medium resource for each encoded media stream; and wherein the stage of rate-shaping is performed such that media streams of a same priority are allocated wireless medium resources that are included within a single wireless medium resource range.

9. The method according to claim 1, wherein the applying, by the transmitter, the transmission parameters on the intermediate media streams comprises encoding the intermediate media streams by the variable encoder of the transmitter.

10. A system for processing media streams; the system comprises:
    a controller, adapted to determine rate-shaping parameters in response to: (i) transmission parameters, (ii) wireless transmission limitations, and (iii) input media stream parameters;
    a rate-shaper, coupled to the controller, adapted to receive multiple input media streams and perform rate-shaping according to the rate-shaping parameters to provide intermediate media streams, wherein the transmission parameters are selected from a group consisting of modulation parameters, preamble, guard bands, and spectral power density
    and a transmitter that comprises a variable encoder, the transmitter is arranged to change at least one transmission parameter in response of the status of the wireless medium and to apply the at least one transmission parameter on the intermediate media streams.

11. The system according to claim 10 wherein the at least one transmission parameter is spectral power density.

12. The system according to claim 11 wherein the controller is adapted to determine rate-shaping parameters in response to wired transmission limitations of a bandwidth limited link coupled between the rate-shaper and the transmitter.

13. The system according to claim 11 wherein the transmitter is adapted to change a preamble.

14. The system according to claim 12 wherein the controller is arranged to change an encoding length of the variable encoder of the transmitter.

15. The system according to claim 11 wherein the controller allocates a wireless medium resource for each encoded media stream and determines the rate-shaping parameters such that transmitted media streams of the same priority are allocated substantially equal amounts of wireless medium resources.

16. The system according to claim 11 wherein the controller is adapted to allocate a wireless medium resource for each encoded media stream and to determine the rate-shaping parameters such that transmitted media streams of a same priority are allocated wireless medium resources that are included within a single wireless medium resource range.

17. The system according to claim 11 further comprising a CDMA compliant variable encoder.

* * * * *